R. A. JOYCE.
SEED PLANTER.
APPLICATION FILED JUNE 10, 1912.
1,063,127.
Patented May 27, 1913.
2 SHEETS—SHEET 2.
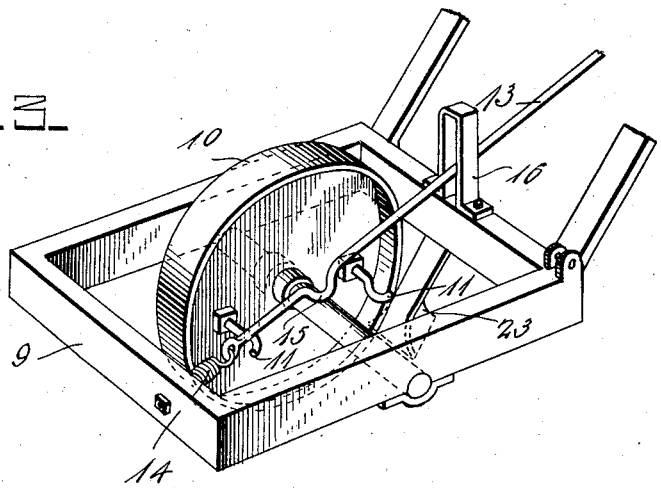
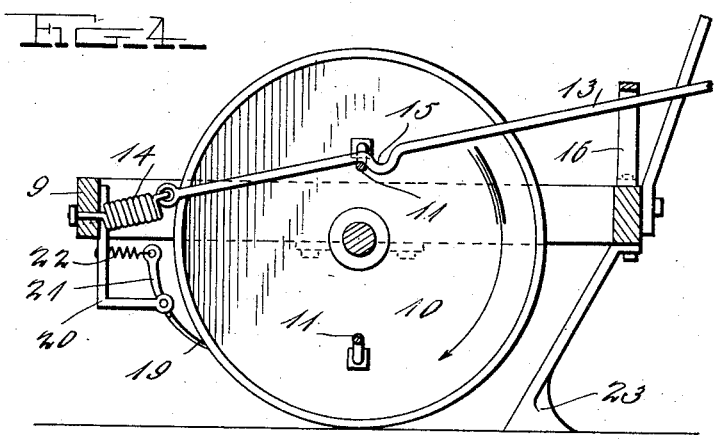
Witnesses
J. R. Pierce
C. E. Hunt.
Inventor
R. A. Joyce
By H. B. Willson &co.
Attorneys

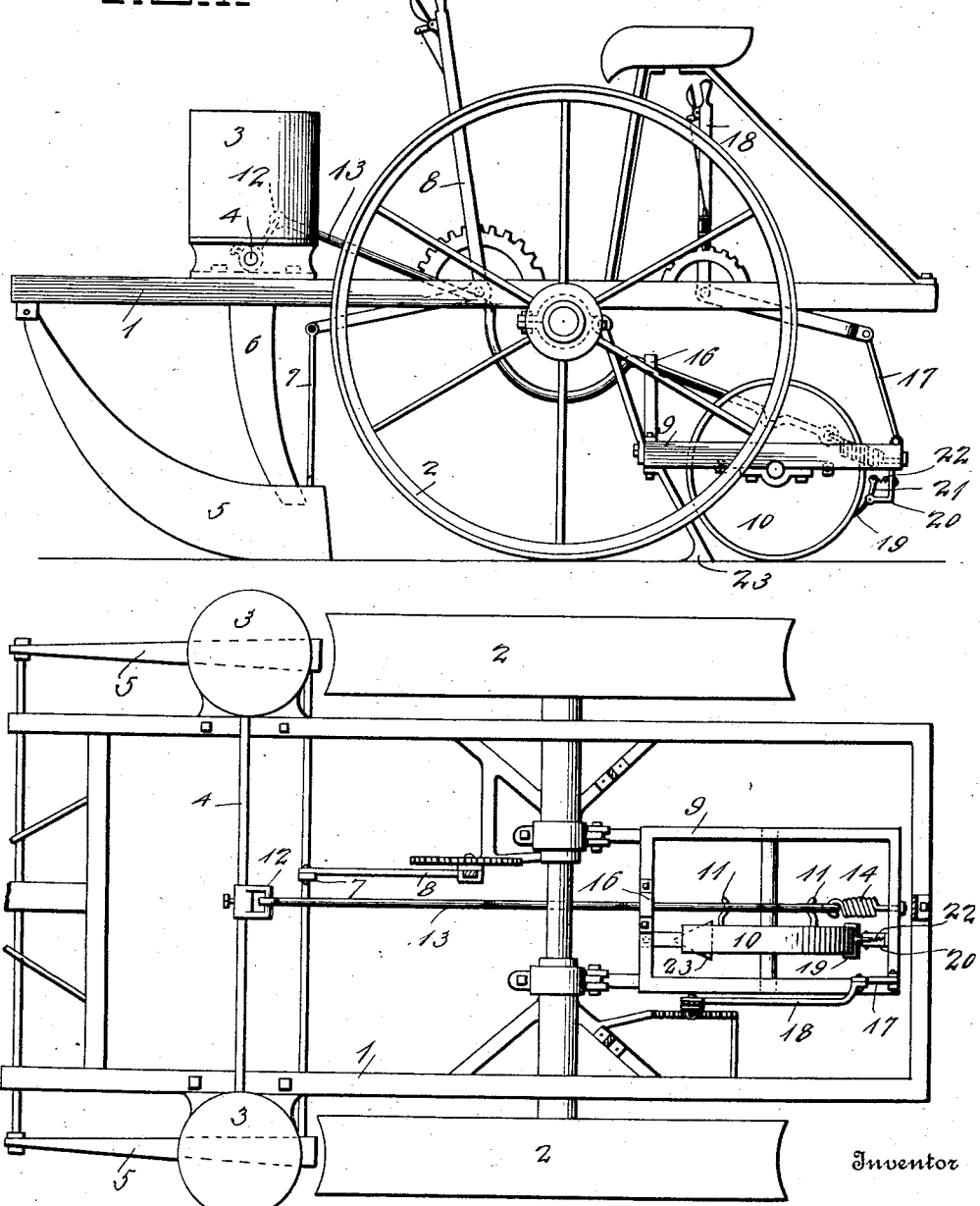

UNITED STATES PATENT OFFICE.

ROBERT A. JOYCE, OF INDEPENDENCE, KANSAS.

SEED-PLANTER.

1,063,127.   Specification of Letters Patent.   Patented May 27, 1913.

Application filed June 10, 1912. Serial No. 702,838.

*To all whom it may concern:*

Be it known that I, ROBERT A. JOYCE, a citizen of the United States, residing at Independence, in the county of Montgomery and State of Kansas, have invented certain new and useful Improvements in Seed-Planters; and I do declare the following to be a full, clear, and exact description of the invention, such as will enable others skilled in the art to which it appertains to make and use the same.

This invention relates to improvements in seed planters.

One object of the invention is to provide a seed planter having an improved means for automatically operating the feeding mechanism whereby seed is dropped in rows at regular intervals as the machine is drawn back and forth across the field.

Another object is to provide a feed operating mechanism for seed planters which will be simple, strong, durable and inexpensive in construction, efficient and reliable in operation and which may be attached to any form of seed planter having an oscillating feed valve operating shaft.

With these and other objects in view, the invention consists of certain novel features of construction, combination and arrangement of parts as will be more fully described and claimed.

In the accompanying drawings: Figure 1 is a side elevation of a seed planter showing the application of the invention; Fig. 2 is a plan view of the same; Fig. 3 is a perspective view of the attachment removed from the planter; Fig. 4 is a vertical longitudinal sectional view of the frame of the feeding mechanism, showing the operative parts in side elevation.

Referring more particularly to the drawings 1 denotes the main frame of the planter and 2 denotes the supporting wheels thereof. On the frame 1 is arranged the usual driver's seat and on the forward end of the frame are arranged the seed hoppers 3 which are provided with the usual or any suitable form of feed valves adapted to be operated by a rock shaft 4 mounted in suitable bearings in the front end of the frame 1 as shown. To the frame 1 are also secured furrow opening shoes or runners 5 and seed conducting tubes 6 which connect the hoppers 3 with the shoes or runners 5. The shoes or runners are hingedly connected to the forward end of the frame 1 and are connected at their rear ends by lifting rods 7 to a lifting lever 8 whereby said runners may be raised or lifted above the ground when the machine is moved from place to place. The machine thus far described may be of any desired construction and forms no part of the present invention.

Arranged at a suitable position in rear of the furrow opening shoes and seed tubes and hingedly connected at its forward end to the axle of the main frame of the machine is a tappet wheel frame 9. Revolubly mounted in suitable bearings in the frame 9 is a tappet wheel 10 on one side of which at diametrically opposite points are arranged hook shaped tappets 11.

Loosely connected at its forward end to an offset loop 12 on the rock shaft 4 of the feed valves is a shaft operating rod 13, the rear end of which is connected by a coiled retracting spring 14 to the rear end of the frame 9. In the rod 13 intermediate its ends is formed an offset or projection 15 with which the tappets 11 on the wheel 10 are successively engaged as the wheel revolves. When the offset 15 on the rod 13 is thus engaged by the tappets 11 the rod will be projected and by means of its connection with the shaft 4 will rock the latter in one direction and as soon as the tappets pass the offset 15, the rod will be retracted by the spring 14 thereby rocking the shaft 4 in the reverse direction. The rocking motion thus imparted to the shaft 4 opens and closes the valves not shown in the seed hoppers and drops the seed in rows at regular intervals. The forward end of the rod 13 is flattened and slidably engaged with a guide loop 16 arranged across the forward end of the frame 9 as shown. The rear end of the frame 9 is connected by a link 17 to a hand lever 18 mounted on a cross bar of the main frame 1 within convenient reach of the driver. By means of the lever 18 the frame 9 and tappet wheel 10 may be lifted or swung upwardly to disengage the wheel from the ground thereby stopping the operation of the feeding mechanism when desired. By means of a feed valve operating mechanism, it will be seen that the seed may be uniformly dropped in straight even rows both ways across a field without the use of a check line, marker, or other device.

In order to keep the tappet wheel 10 clean and free from dirt or trash which might adhere thereto, I provide a scraper 19 which is pivotally mounted in a supporting bracket 20 secured to the inner side of a rear bar of the frame 9. The scraper 19 is provided with an upwardly projecting arm 21 which is connected by a short coiled spring 22 to the upper portion of the bracket 20, while the scraper is yieldingly held in operative engagement with the rim or periphery of the tappet wheel 10 thereby scraping or removing all foreign matter which may adhere to or tend to accumulate thereon. In addition to the scraper 19 I also preferably provide a fender 23 arranged in front of the tappet wheel 10 and suitably secured to the front cross bar of the frame 9 whereby weeds, vines or other obstructions will be caught and turned aside and prevented from catching into or interfering with the operation of the wheel 10.

From the foregoing description and illustration of the invention it will be observed that the offset or projection 15 of the lever 13 forms a very important feature of the invention and while the same is adapted to be movably engaged with the shaft of the grain feeding mechanism, said offset is intermittently actuated by the tappets 11 during the travel of the wheel 10. It will therefore be seen that the lever 13 as constructed comprises an essential part of the invention whereby the grain is delivered from the hoppers at regular and proper intervals.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described and ascertained the nature of my invention, I declare that what I claim is:—

In a planter the combination with an operating mechanism of a frame adapted to be movably secured in rear of the main drive wheels of the planter, said mechanism comprising a wheel centrally mounted upon said frame, a guide projecting upwardly from one end of the frame, a coiled spring attached to the opposite end of the frame, a lever having one of its ends attached to said spring and provided with an offset or projection which is adapted for yielding contact with the shaft of the mechanism and tappets projecting from one side of the wheel and adapted for engagement with the lever on either side of the offset thereof whereby the lever is held in proper position and the offset thereof yieldingly engaged with the tappets projecting from the wheel to cause the grain to be properly deposited at intervals.

In testimony whereof I have hereunto set my hand in presence of two subscribing witnesses.

ROBERT A. JOYCE.

Witnesses:
  F. E. BEAL,
  O. P. GAMBLE.